(12) United States Patent
Rekeny

(10) Patent No.: US 8,794,340 B2
(45) Date of Patent: Aug. 5, 2014

(54) SELF-ALIGNING COVER SPRING FOR A CONCEALED SPRINKLER

(75) Inventor: Michael Rekeny, Caledonia, MI (US)

(73) Assignee: The Viking Corporation, Hastings, MI (US)

( * ) Notice: Subject to any disclaimer, the term of this patent is extended or adjusted under 35 U.S.C. 154(b) by 134 days.

(21) Appl. No.: 13/440,149

(22) Filed: Apr. 5, 2012

(65) Prior Publication Data
US 2012/0187216 A1    Jul. 26, 2012

Related U.S. Application Data

(62) Division of application No. 12/415,588, filed on Mar. 31, 2009, now Pat. No. 8,176,987.

(51) Int. Cl.
*A62C 37/08*    (2006.01)

(52) U.S. Cl.
USPC ............... 169/38; 169/51; 169/57; 239/288.5

(58) Field of Classification Search
USPC ........... 169/37, 90, 38, 39, 40, 41, 42, 57–59, 169/51; 239/288–288.5; 267/158–165
See application file for complete search history.

(56) References Cited

U.S. PATENT DOCUMENTS

| | | |
|---|---|---|
| 2,922,669 A | 1/1960 | Hansen |
| 4,880,063 A | 11/1989 | Leininger et al. |
| 6,024,177 A | 2/2000 | Winebrenner |
| 6,805,203 B2 | 10/2004 | Retzloff et al. |
| 2006/0260821 A1 | 11/2006 | Gow et al. |
| 2007/0215720 A1 | 9/2007 | Koiwa |

*Primary Examiner* — Christopher Kim
(74) *Attorney, Agent, or Firm* — Harness, Dickey & Pierce, P.L.C.

(57) ABSTRACT

A spring may include an annular plate having a central aperture; a plurality of spring members protruding from the annular plate, the plurality of spring members being resiliently flexible and radially disposed around the central aperture; and a plurality of alignment tabs protruding from the annular plate.

8 Claims, 5 Drawing Sheets

SELF-ALIGNING COVER SPRING FOR A CONCEALED SPRINKLER

CROSS-REFERENCE TO RELATED APPLICATIONS

This application is a divisional of U.S. patent application Ser. No. 12/415,588 filed on Mar. 31, 2009 (now U.S. Pat. No. 8,176,987, issued May 15, 2012). The entire disclosures of the above application is incorporated herein by reference.

FIELD

The present disclosure relates to a spring and more particularly to a cover spring for a concealed sprinkler.

BACKGROUND

The statements in this section merely provide background information related to the present disclosure and may not constitute prior art.

Fire protection sprinklers are commonly mounted to ceilings of residential and commercial buildings. Such sprinklers are often housed within an opening in the ceiling in such a manner that the sprinkler does not protrude below the surface of the ceiling when not in use. A decorative cover plate assembly may be installed over the opening in the ceiling to conceal the sprinkler, improving the aesthetic qualities of the sprinkler system.

In response to heat from a fire, solder holding the cover plate in place melts and the cover falls away from the sprinkler and the sprinkler trigger mechanism is then activated by the heat of the fire to release a plug device to allow the sprinkler to discharge water below the ceiling. The sprinkler cover assembly may include a spring which may force the cover plate to fall away from the sprinkler once the solder begins to melt. Such springs are often difficult to install, and difficult to properly align within the cover plate assembly.

SUMMARY

A spring may include an annular plate having a central aperture; a plurality of spring members protruding from the annular plate, the plurality of spring members being resiliently flexible, the plurality of spring members being radially disposed around the central aperture; and a plurality of alignment tabs protruding from the annular plate.

A cover assembly for a concealed sprinkler may include a base, a cover plate and a spring plate. The base may include a tubular portion, a flange portion and a plurality of mounting tabs. The flange portion may extend radially from the tubular portion to form an L-shaped cross section. The base may be adapted to engage a sprinkler assembly. The cover plate may be soldered to the mounting tabs of the base. The spring plate may be disposed between the cover plate and the flange portion. The spring plate may have a plurality of spring members resiliently compressed between the cover plate and the flange portion, thereby biasing the cover plate away from the flange portion. The spring plate may include a plurality of alignment tabs protruding therefrom. The alignment tabs may be adapted to laterally align the spring plate relative to the base.

A fire protection sprinkler system may include a sprinkler, a base, a cover plate and a spring plate. The sprinkler may be fluidly connected to a water pipe. The base may be disposed around at least a portion of the sprinkler, and the base may have a tubular portion, a flange portion and a plurality of mounting tabs. The cover plate may engage the plurality of mounting tabs. The spring plate may have a plurality of alignment tabs and a plurality of spring members. The spring members may be resiliently compressed between the cover plate and the flange portion. The alignment tabs may protrude from the spring plate and at least partially surround the tubular portion. At least partial melting of solder retaining the cover plate to the flange portion allows the spring members to forcibly disengage the cover plate from the base, thereby allowing the spring plate and the cover plate to fall away from the base.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
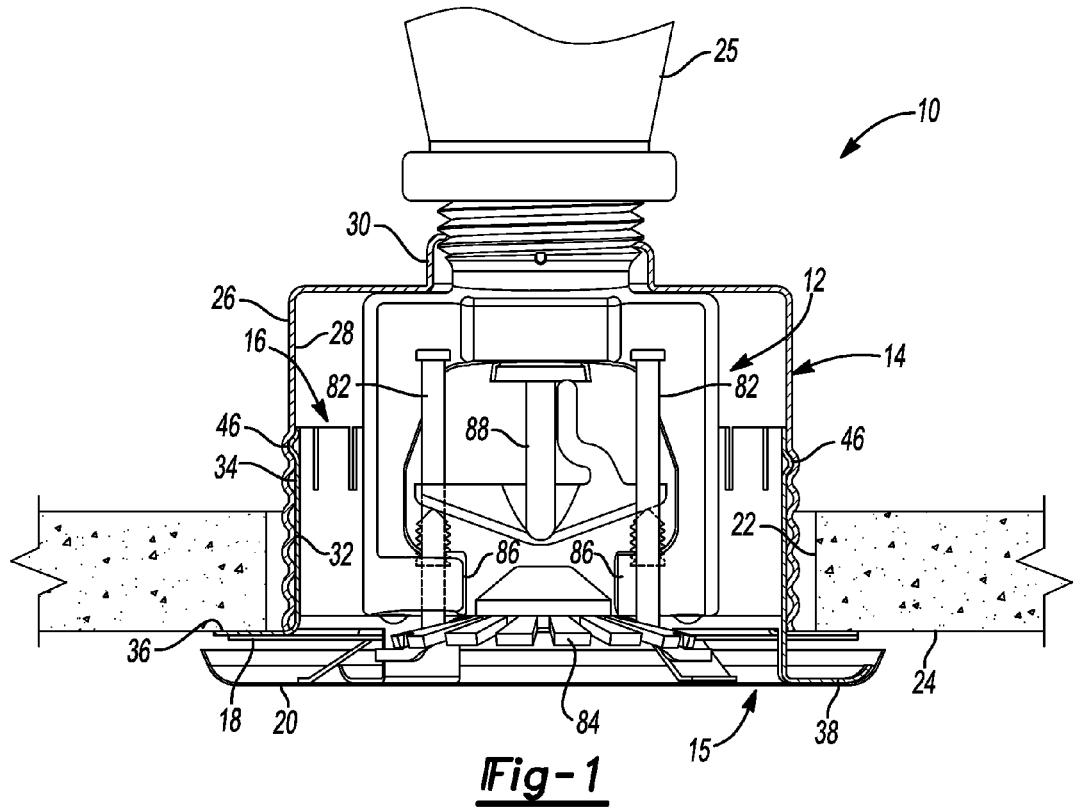
FIG. 1 is a partial cut-away view of a concealed sprinkler assembly having a cover assembly installed thereon according to the principles of the present disclosure.

The following description is merely exemplary in nature and is not intended to limit the present disclosure, application, or uses. It should be understood that throughout the drawings, corresponding reference numerals indicate like or corresponding parts and features.

With reference to FIG. 1, a sprinkler assembly 10 is provided and may include a sprinkler 12, an adapter 14, and a concealed cover assembly 15. The sprinkler assembly 10 may be installed above or within an opening 22 in a ceiling 24 of a building, for example. The sprinkler assembly 10 can also be installed in a sidewall of the building, or any other suitable location. The sprinkler 12 is coupled to a pipe 25 for fluid communication therebetween.

The adapter 14 may have an outer diameter 26, an inner diameter 28, and an end portion 30 fixed to the sprinkler assembly 10. Threads or ribs 32 may be formed in the inner diameter 28. The adapter 14 may surround at least a portion of the sprinkler 12.

Figure 8:
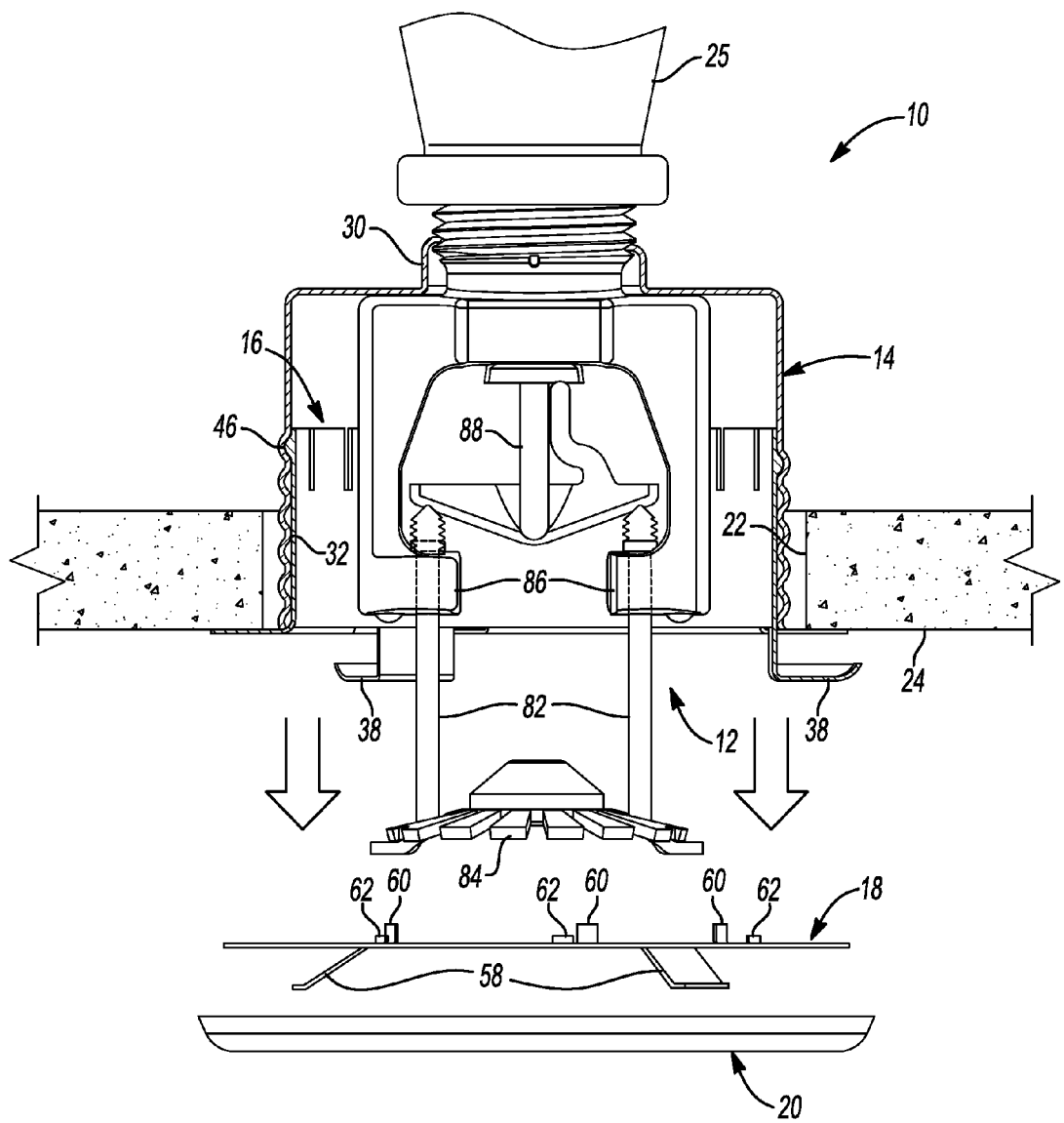
FIG. 8 is a cross sectional view of the sprinkler assembly of FIG. 1 in a deployed position according to the principles of the present disclosure.

The concealed cover assembly 15 may be assembled to the adapter 14 to cover the sprinkler assembly 10 and the opening 22 in the ceiling 24 to improve aesthetic qualities of the sprinkler assembly 10. The concealed cover assembly 15 may include a base 16, a spring plate 18 and a cover plate 20. When the sprinkler assembly 10 is exposed to a sufficiently high level of heat, the cover plate 20 falls away from the sprinkler assembly 10, as will be subsequently described. At least a portion of the sprinkler 12 may then protrude below the ceiling 24, as shown in FIG. 8, and when the sprinkler is triggered, the sprinkler can discharge water (or any other fire suppressant or extinguishing agent) into the area of coverage.

Figure 3:
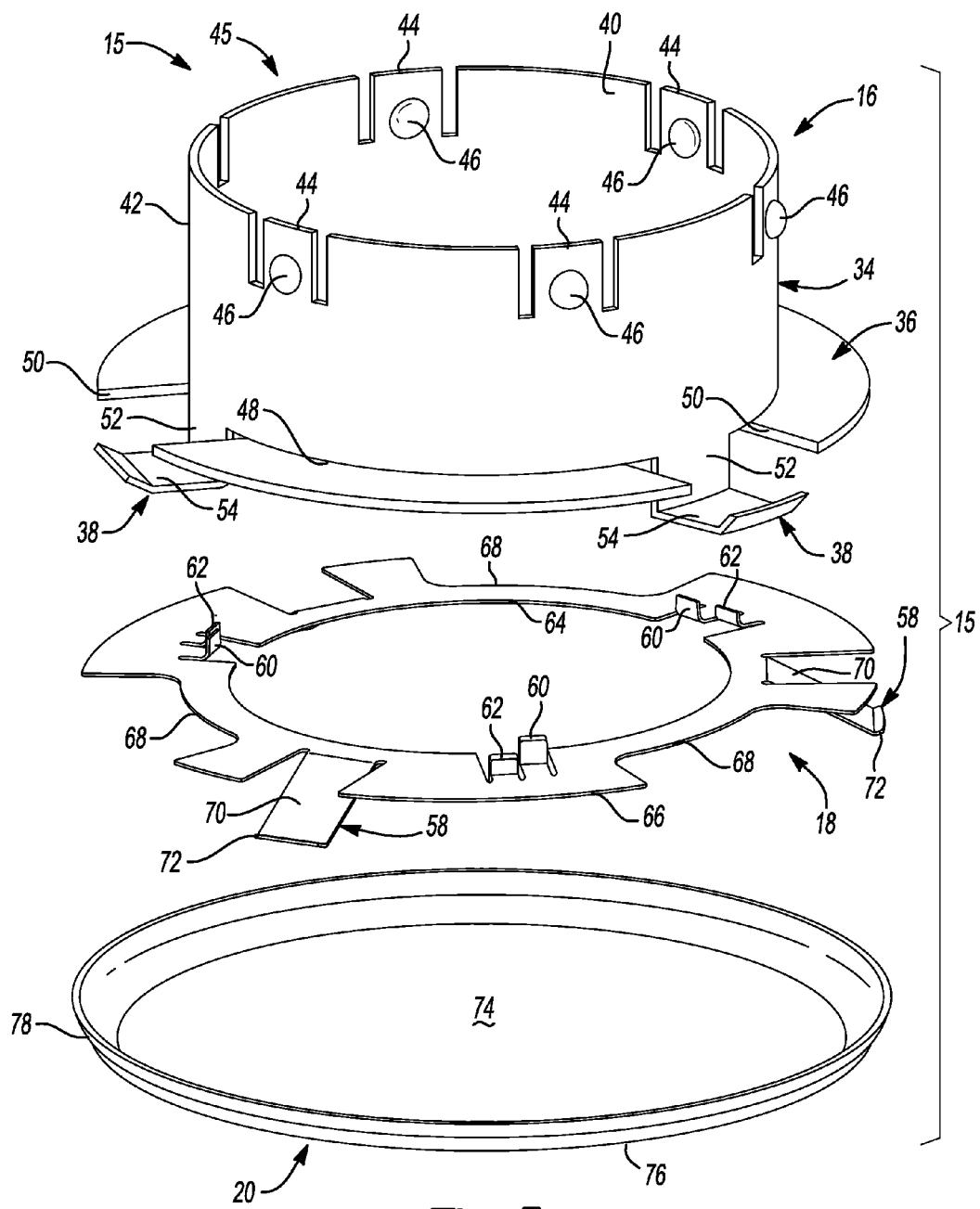
FIG. 3 is a an exploded perspective view of the cover assembly of FIG. 2.

Referring now to FIG. 3, the base 16 may include a tubular portion 34, a flange portion 36 and a plurality of mounting tabs 38, which may be integrally formed from copper, brass, aluminum or any other suitable metallic or other material. The tubular portion 34 may include an inner diameter 40, an outer diameter 42 and a plurality of flexible fingers 44. The fingers 44 may be disposed at a first end 45 of the tubular portion and may include a plurality of protuberances 46 protruding outward from the outer diameter 42. The protuberances 46 may threadably engage the threads 32 of the adapter 14, such that the tubular portion 34 of the base can be received within the inner diameter 28 of the adapter 14 (FIG. 1). It should be appreciated that the adapter 14 and the base 16 can be configured such that the base 16 engages threads disposed on the outer diameter 26 of the adapter 14.

The flange portion 36 may extend radially outward from a second end 48 of the tubular portion 34. The flange portion 36 may include a plurality of notches 50. The mounting tabs 38 may include an axially disposed portion 52 and a radially disposed portion 54, forming a generally L-shape. The axially disposed portion 52 may extend downward from the second end 48 of the tubular portion 34 at the notches 50 (FIG. 3). The radially disposed portion 54 may extend outward, generally parallel to the flange portion 36.

Figure 4:
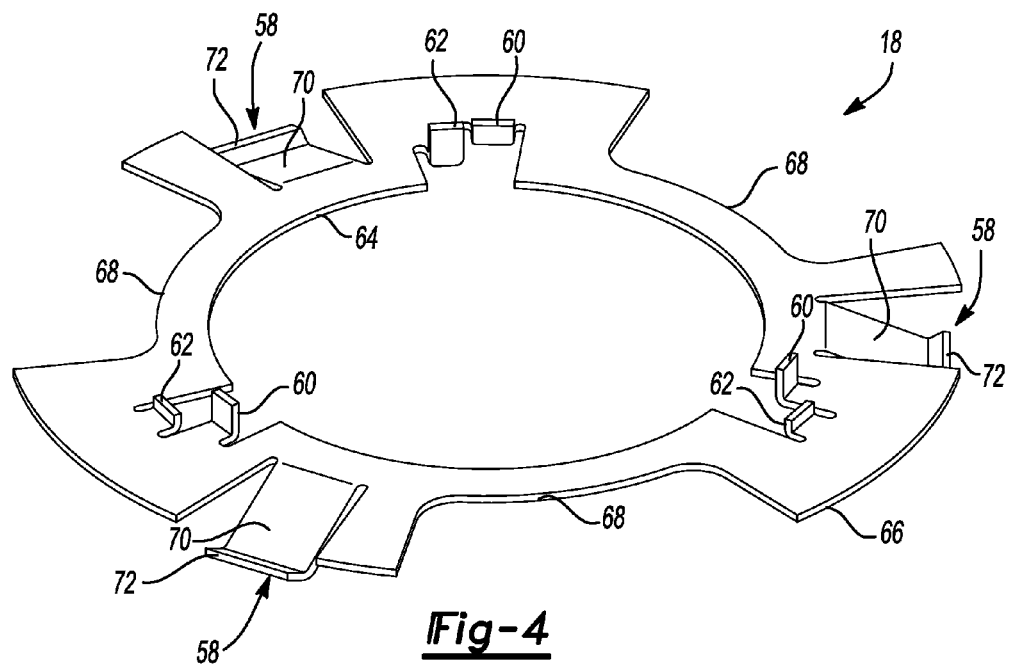
FIG. 4 is a perspective view of a spring plate according to the principles of the present disclosure.
Figure 5:
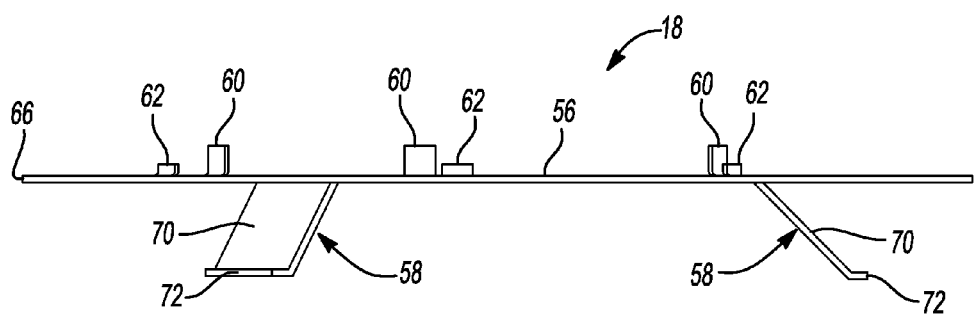
FIG. 5 is a side view of the spring plate of FIG. 4.

With reference to FIGS. 4 and 5, the spring plate 18 may include an annular plate portion 56, a plurality of spring members 58, a first set of alignment tabs 60 and a second set of alignment tabs 62. The annular plate portion 56 may include a central aperture 64 and an outer diameter 66 having a plurality of radially disposed notches 68 cut therefrom. The spring plate 18 may be formed from copper, brass, aluminum, or any other suitable metallic or other material.

The plurality of spring members 58 are spaced in a circular pattern. Each of the spring members 58 may be integrally formed with the annular plate portion 56 and may include a leg portion 70 and a foot portion 72. The spring members 58 may protrude from the spring plate 18 generally away from a first side of the annular plate portion 56. The spring members 58 may extend therefrom in a direction having a radial component and an axial direction, such as, for example, at approximately a 45 degree angle (or any other suitable angle) relative to the annular plate portion 56 (FIG. 5). The foot portion 72 may extend from a distal end of the leg portion 70 in a generally outward radial direction.

The alignment tabs 60, 62 may protrude from a second side of the annular plate portion 56 in a generally axial direction. The first set of alignment tabs 60 may be longer than the second set of alignment tabs 62, i.e., the first set of alignment tabs 60 may extend farther from the annular plate portion 56 than the second set of alignment tabs 62. The first set of alignment tabs 60 are spaced in a circular pattern having a first diameter. The second set of alignment tabs 62 are spaced in a circular pattern having a second diameter which may be larger than the first diameter. The first and second diameters may be substantially concentric with the central aperture 64.

With reference to FIG. 3, the cover plate 20 may be a circular plate having an inner face 74, and outer face 76, and a lip 78 disposed around a perimeter of the cover plate 20. The cover plate 20 may have a diameter that is sufficiently large to cover the opening 22 in the ceiling 24 to conceal the sprinkler assembly 10 (FIG. 1). The cover plate 20 may be formed from copper, brass, aluminum, or any other suitable metallic or other material.

Figure 6:
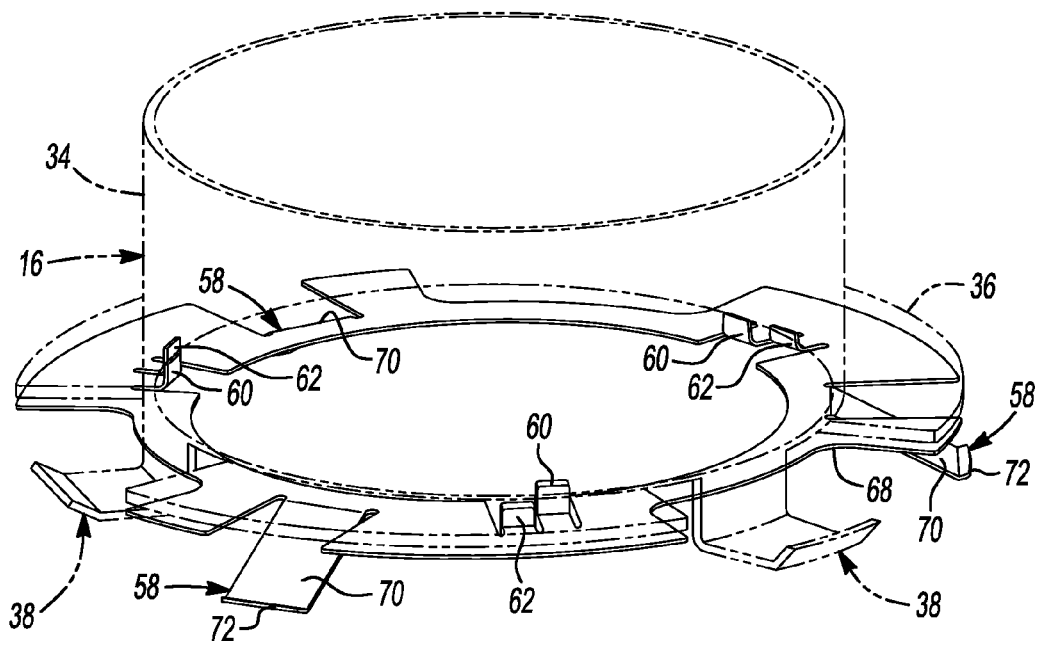
FIG. 6 is a perspective view of a base aligned to a first set of alignment tabs according to the principles of the present disclosure.

The spring plate 18 may be arranged between the flange portion 36 of the base 16 and the inner face 74 of the cover plate 20 such that the mounting tabs 38 of the base 16 may protrude through the notches 68 in the annular plate portion 56 of the spring plate 18. Depending on the size of the particular base 16, one of the first or second sets of alignment tabs 60, 62, respectively, may engage the inner diameter 40 of the tubular portion 34 of the base 16. For example, if the base 16 has a smaller inner diameter 40, the first set of alignment tabs 60 may engage the inner diameter 40 (FIG. 6). In this manner, the first set of alignment tabs 60 interfere with the inner diameter 40 to prevent relative lateral movement between the spring plate 18 and the base 16, thereby ensuring proper alignment therebetween. In this configuration, the flange portion 36 of the base 16 may rest on the second set of alignment tabs 62, while the longer first set of alignment tabs 60 at least partially protrude up within the tubular portion 34 of the base 16, engaging the inner diameter 40 (FIG. 6).

Figure 7:
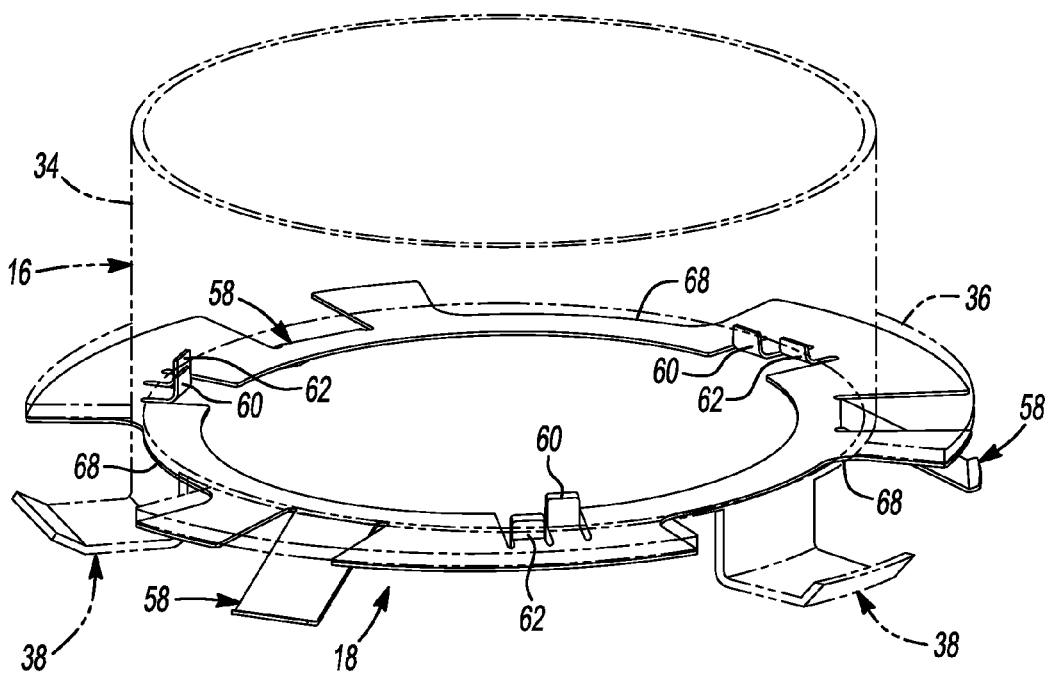
FIG. 7 is a perspective view of a base aligned to a second set of alignment tabs according to the principles of the present disclosure.

Alternatively, if the base 16 has a larger inner diameter 40, the second set of alignment tabs 62 may engage the inner diameter 40, while the flange portion 36 abuts the annular plate portion 56 of the spring plate 18 (FIG. 7). In this configuration, interference between the second set of alignment tabs 62 and the inner diameter 40 prevents relative lateral movement between the spring plate 18 and the base 16, thereby ensuring proper alignment therebetween.

It should be appreciated that in either of the above configurations shown in FIGS. 6 and 7, the first or second alignment tabs 60, 62 may not actually contact the inner diameter 40 when the spring plate 18 is centered on the base 16 (i.e., when the diameters on which the alignment tabs are disposed are concentric with the inner diameter 40). Rather, a small gap may exist between alignment tabs 60 or 62 and the surface of the inner diameter 40 to prevent the spring plate 18 from binding on the base 16, while preventing sufficient lateral movement to misalign the spring plate 18 relative to the base 16. In this manner, the alignment tabs 60 or 62 will maintain alignment between the spring plate 18 and the base 16 within a predetermined tolerance. It should also be appreciated that the spring plate 18 could include any number of sets of alignment tabs (from one set to several sets) to correspond to bases having any number of inner diameter sizes.

Figure 2:
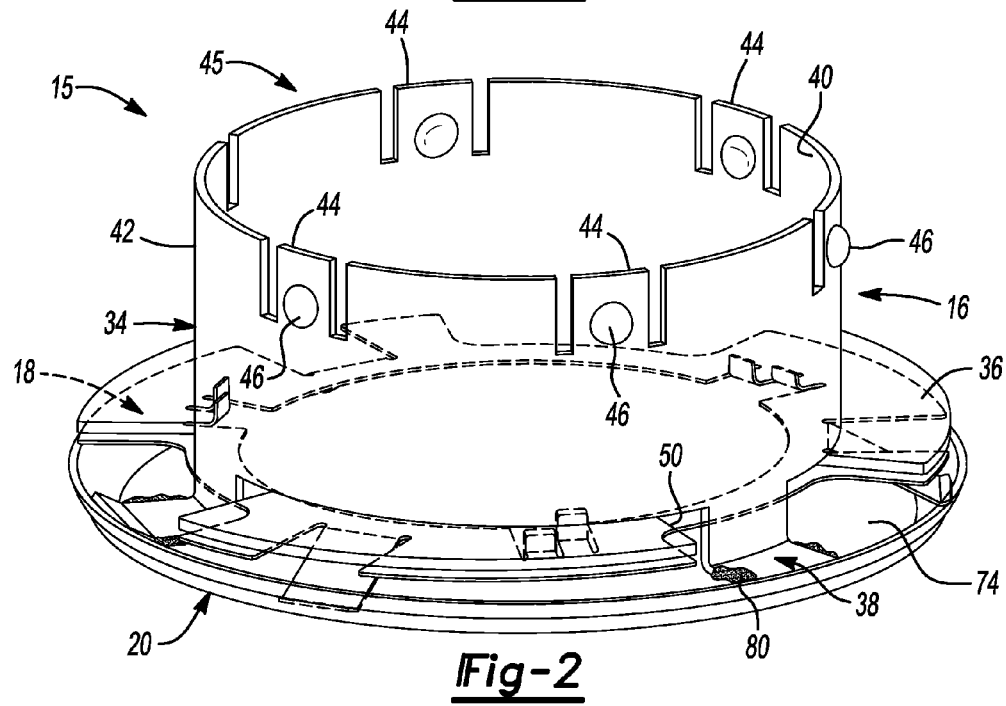
FIG. 2 is a perspective view of a cover assembly according to the principles of the present disclosure.

With the alignment tabs 60 or 62 maintaining proper alignment between the spring plate 18 and the base 16, the cover plate 20 may be mounted to the mounting tabs 38 of the base 16. The inner face 74 of the cover plate 20 compresses each spring member 58, such that the inner face 74 contacts the mounting tabs 38 of the base 16 (FIGS. 1 and 2). The inner face 74 of the cover plate 20 may then be soldered to the mounting tabs 38 of the base 16, retaining the cover plate 20 against the base 16 with the spring members 58 resiliently compressed therebetween. In this manner, the spring members 58 bias the cover plate 20 away from the base 16. Proper alignment between the spring plate 18 and the base 16 (provided by the alignment tabs 60 or 62) provides a uniform spring force over the inner face 74 of the cover plate 20 to bias the cover plate 20 away from the base 16. Uniform spring force may ensure that the cover plate 20 disengages from all of the plurality of mounting tabs 38 substantially simultaneously, thereby facilitating complete disengagement of the cover plate 20 from the sprinkler assembly 10.

Solder 80 is applied to the inner face 74 of the cover plate 18 and the mounting tabs 38 (FIG. 2). The solder 80 may be any suitable type of solder to bond the materials of the cover plate 20 and the base 16. The melting point of the solder 80 may be at a predetermined temperature to facilitate the release of the cover plate 20 once a predetermined amount of heat conducts through the thickness of the cover plate 20, as will be subsequently described.

As described above, the protuberances 46 may engage threads 32 disposed on the adapter 14, thereby securing the base 16 to the adapter 14. The concealed cover assembly 15 may be installed as a modular unit onto the sprinkler assembly 10 once the sprinkler head 12 and adapter 14 are installed above the ceiling 24.

Referring now to FIGS. 1-8, operation of the concealed cover assembly 15 will be described in detail. As described above, the concealed cover assembly 15 fits onto the sprinkler assembly 10 such that the cover plate 20 covers the opening 22 in the ceiling 24. In response to a predetermined amount of heat from a fire, for example, the solder 80 will begin to melt. As the solder 80 melts, the retaining force of the solder 80 retaining the cover plate 20 against the base 16 begins to weaken. Once the solder 80 is sufficiently melted, the biasing force of the spring members 58 will overcome the retaining force of the solder 80, forcing the cover plate 20 to fall off of the base 16, away from the sprinkler assembly 10, allowing at least a portion of the sprinkler 12 to protrude through the opening 22 and below the ceiling 24 (FIG. 8). In the particular embodiment illustrated in FIG. 8, posts 82, having a deflector 84 disposed thereon, are allowed to slide downward within brackets 86 in response to the cover plate 20 falling away from the sprinkler assembly 10, thereby positioning the deflector 84 below the ceiling 24 in a deployed position.

The composition of the solder 80 should be selected such that the solder 80 will melt in response to exposure to a level of heat at which it is desirable to trigger the discharge of water or other fire suppressing or extinguishing material. Likewise, the spring rate of the spring members 58 are selected to allow the spring members 58 to break the bond of the partially melted solder 80, while preventing the spring members 58 from breaking the bond of the solidified solder 80.

The sprinkler assembly 10 may also include a bulb-type trigger 88 filled with a fluid which will expand and break the bulb 88 in response to further exposure to heat. Alternatively, a fusible linkage type trigger mechanism can also be used, as is known in the art. This ultimately triggers the discharge of water or other fire suppressing or extinguishing material out of the sprinkler head 12.

The description of the present disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A fire protection sprinkler system comprising:
   a sprinkler head;
   a base disposed around at least a portion of said sprinkler head, said base having a tubular portion, a flange portion and a plurality of mounting tabs;
   a cover plate engaging said plurality of mounting tabs; and
   a spring plate having a plurality of alignment tabs and a plurality of spring members, said spring members being resiliently compressed between said cover plate and said flange portion, said alignment tabs protruding from said spring plate toward said base and at least partially received within and surrounded by said tubular portion of said base,
   wherein at least partial melting of solder retaining said cover plate to said flange portion allows said spring members to forcibly disengage said cover plate from said base, thereby allowing said spring plate and said cover plate to fall away from said base.

2. The sprinkler system according to claim 1, wherein interference between said alignment tabs and an inner diameter of said tubular portion prevent misalignment between said spring plate and said base.

3. The sprinkler system according to claim 1, wherein a first set of alignment tabs are radially disposed on a first diameter and a second set of alignment tabs are radially disposed on a second diameter different than said first diameter.

4. The sprinkler system according to claim 3, wherein said spring plate can be used with multiple different sized bases, wherein said first set of alignment tabs correspond to a first base having a first size and said second set of alignment tabs correspond to a second base having a second size different than the first size.

5. The sprinkler system according to claim 1, wherein said spring members protrude at an angle from said spring plate.

6. The sprinkler system according to claim 1, wherein said alignment tabs protrude substantially perpendicularly from said spring plate.

7. The sprinkler system according to claim 1, wherein said plurality of mounting tabs are integrally formed as a unitary member with said tubular portion and said flange portion of said base.

8. The sprinkler system according to claim 1 wherein said spring plate includes an annular plate portion with the plurality of spring members and the plurality of alignment tabs integrally formed with the annular plate portion, said plurality of alignment tabs protruding in a first axial direction from the annular plate portion and the plurality of spring members protruding in a second axial direction opposite the first axial direction from the annular plate portion.

* * * * *

UNITED STATES PATENT AND TRADEMARK OFFICE
CERTIFICATE OF CORRECTION

| | | |
|---|---|---|
| PATENT NO. | : 8,794,340 B2 | Page 1 of 1 |
| APPLICATION NO. | : 13/440149 | |
| DATED | : August 5, 2014 | |
| INVENTOR(S) | : Michael Rekeny | |

It is certified that error appears in the above-identified patent and that said Letters Patent is hereby corrected as shown below:

In the Specification

At column 4, line number 66, delete "18" and insert "20".

Signed and Sealed this
Third Day of March, 2015

Michelle K. Lee
*Deputy Director of the United States Patent and Trademark Office*